United States Patent [19]
Tanaka

[11] Patent Number: 4,466,713
[45] Date of Patent: Aug. 21, 1984

[54] LENS HOLDING STRUCTURE AND WIRE MATERIAL

[75] Inventor: Susumu Tanaka, Suwa, Japan

[73] Assignee: Kabushiki Kaisha Suwa Seikosha, Tokyo, Japan

[21] Appl. No.: 299,456

[22] Filed: Sep. 4, 1981

[30] Foreign Application Priority Data

Sep. 8, 1980 [JP] Japan .............................. 55-127474

[51] Int. Cl.³ .......................... G02C 1/00; G02C 1/08; G02C 1/04
[52] U.S. Cl. ....................................... 351/106; 351/86; 351/92
[58] Field of Search ................... 351/106, 86, 92, 109, 351/142, 154; 2/442, 443

[56] References Cited

U.S. PATENT DOCUMENTS 3,174,851 3/1965 Buehler et al. .

FOREIGN PATENT DOCUMENTS 1039282 10/1953 France ............................... 351/106
163052 12/1979 Japan .

Primary Examiner—John K. Corbin
Assistant Examiner—Rodney B. Bovernick
Attorney, Agent, or Firm—Blum Kaplan Friedman Silberman and Beran

[57] ABSTRACT

A spectacle frame wherein each lens is held against a rim by a thin wire for providing a rimless appearance is provided. The spectacle structure includes a wire having at least one enlarged end and a rim for receiving the lens with the enlarged end of the wire engaged in one end of the rim and secured at the opposing rim for compressively retaining the lens in the rim. The wire is formed of a super-elastic material, such as a Ni-Ti alloy.

6 Claims, 7 Drawing Figures

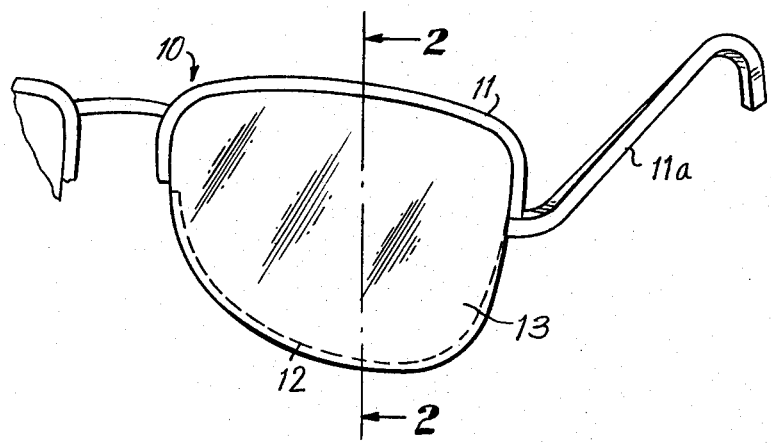
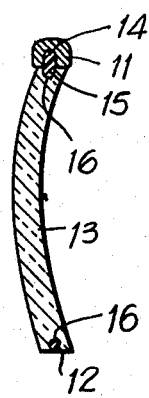
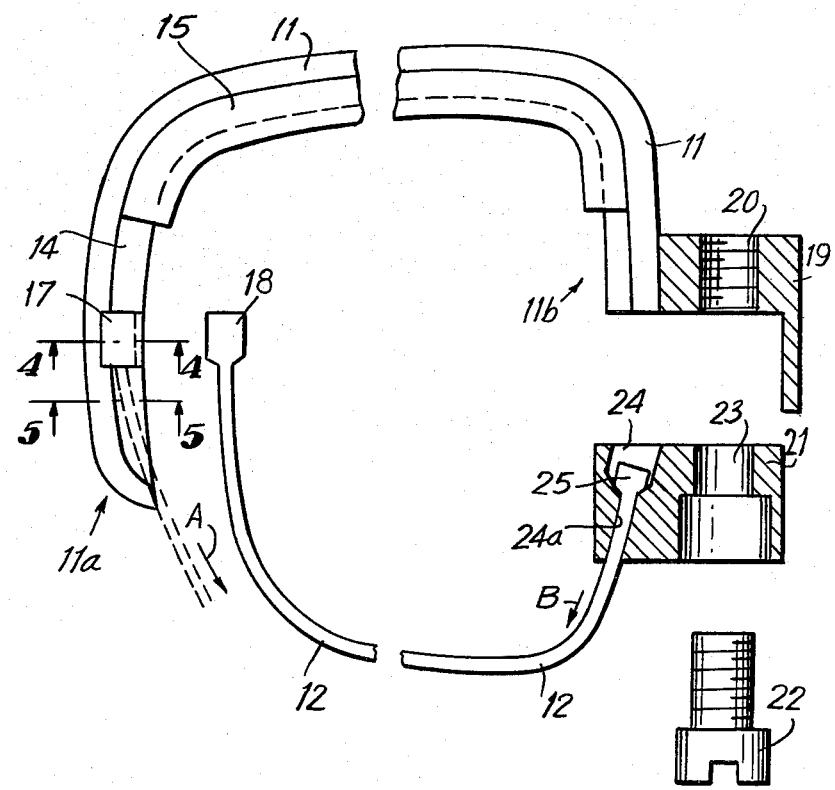

LENS HOLDING STRUCTURE AND WIRE MATERIAL

BACKGROUND OF THE INVENTION

This invention relates generally to spectacles, and more particularly to a rimless frame for a pair of spectacles wherein each lens is held by a rim and thin wire.

The use of a thin wire for supporting the bottom half of a spectacle lens effectively reduces the weight of the frame and spectacles. Additionally, the absence of a conventional thick rim supporting the lower half of the lenses makes the spectacle frame easier to fit to a wearer's face. Conventional rim and wire spectacle frames utilize a wire formed of a nylon, other plastic material, Ni-Cr alloy, stainless steel, or other metallic material. Japanese Laid Open Specification No. 54-163,052, assigned to the same assignee as the subject application, discloses a rimless frame for glasses wherein the lenses are held in position by a super-elastic wire. During use, nylon wire stretches so that the lens tends to fall out of the frame. A metallic wire is generally not elastic so it is not suitable for use wherein there is deviation in dimensions due to processing a lens or the groove in a spectacle rim.

Accordingly, it would be desirable to provide a spectacle frame including a rim and thin wire for supporting the lower half of the lens which does not suffer from the shortcomings of the prior art.

SUMMARY OF THE INVENTION

Generally speaking, in accordance with the invention, a spectacle frame wherein the lens is retained within a rim by a thin wire is provided. The thin wire is of a super-elastic material, such as a Ni-Ti alloy. Preferably the Ni-Ti alloy contains between 50.5 and 51.5 atomic percent Ni with the balance being Ti.

The spectacle frame includes a rim having temples extending therefrom for supporting the spectacles on the wearer's ears. The lenses are held in a groove formed in the rim by a thin wire across the bottom portion of the lens. The wire is formed with enlarged ends. One end of the rim includes a hole for receiving the enlarged end of the wire and the other end of the frame includes a securing member wherein the second end of the wire is fitted and secured after the lens is inserted into the rim.

Accordingly, it is an object of the invention to provide an improved lens holding structure.

Another object of the invention is to provide an improved spectacle frame including a spectacle rim and wire material.

Still another object of the invention is to provide a lens holding structure utilizing a thin wire of a super-elastic material.

Still a further object of the invention is to provide an improved spectacle frame wherein a lens is held against the rim by a thin wire of a Ni-Ti alloy.

Still other objects and advantages of the invention will in part be obvious and will in part be apparent from the specification.

The invention accordingly comprises the features of construction, combination of elements and arrangment of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a perspective view of a portion of an eyeglass frame constructed and arranged in accordance the invention;

FIG. 2 is a cross-sectional view of the eyeglasses of FIG. 1 taken along line 2—2;

FIG. 3 is an exploded view in elevation of a portion of lens holding structure constructed and arranged in accordance with the invention;

DESCRIPTION OF THE PREFERRED EMBODIMENTS

Figure 4:
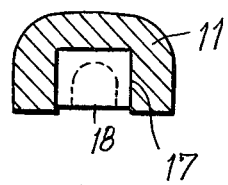
FIG. 4 is a sectional view taken along line 4—4 of FIG. 3.

FIGS. 1 and 2 illustrate a pair of spectacles shown generally as 10 which includes a rim 11 having a temple 11a extending therefrom and a lens 13 held in position within rim 11 by a thin wire 12. Rim 11 is formed with a groove 14 along its inner surface. A plastic strip 15 is positioned with one longitudinal edge embedded within groove 14 and the other longitudinal edge projecting from the inner surface of rim 11. Lens 13 has a peripheral edge surface formed with a thin groove 16 for receiving projecting edge of strip 15 in the upper half of lens 13. Wire 12 is engaged in groove 16 in the lower half of lens 13 for supporting lens 13 against rim 11.

Groove 16 in lens 13 may have a depth which is greater than the diameter of wire 12. In this case, wire 12 will be concealed within groove 16 and be totally invisible when viewed in the front elevation of frame 10. Wire 12 has one end secured to the inner surface of rim 11 at one end thereof. Plastic strip 15 projecting from the inner surface of rim 11 are engaged in groove 16 in the upper half of lens 13. A fitting member 11 shown in FIG. 3 is secured to the opposite of wire 12 and screwed to the opposite end of rim 11 for securing lens 13 in frame 10 along the bottom of lens 13.

Wire 12 may be formed of nylon, other polymeric materials, Ni-Cr alloys, stainless steel or other metallic material, or a super-elastic material, such as a Ni-Ti alloy. Preferably, wire 12 is formed of a Ni-Ti alloy including between 50.5 and 51.5 molar percent of nickel. This composition has been found suitable because the alloy is super-elastic and can be stretched under tension like rubber. Lens 13 preferably has a circumference which is slightly greater than the combined length of rim 11 and wire 12 when relaxed, so that when lens 13 is mounted within frame 10 and wire 12 screwed down to rim 11, wire 12 will be subjected to tension and stretched. When the screws securing wire 12 are tightened fully, lens 13 will be secured to frame 10 by virtue of a positive load due to the super elasticity of wire 12. If wire 12 has a diameter, for example of 0.35 mm, a force of from 2 to 5 kg bears on lens 12. Wire 12 returns to its original length upon loosening the screw and removing tension therefrom.

Customary methods may be employed for securing a wire of a Ni-Ti alloy or the like to the rim. However, it is preferable to secure the wire mechanically in order to maintain its strength and other desirable characteristics. The mechanical method for securing the wire in accordance with the invention is also preferable for securing a wire of another material from the standpoint of strength and fabrication accuracy. This method of securing the wire in accordance with the invention will now be described in detail.

Referring now to FIG. 3, the manner in which wire 12 is secured to both ends of rim 11 is shown. Rim 11 is formed with a hole 17 in its inner surface at a first end 11a shown on the left-hand side in FIG. 3. Wire 12 is formed with an enlarged head portion 18 formed by forging the end of wire 12. Enlarged head portion 18 is forced into hole 17 as it is moved from the right-hand side in FIG. 3 towards rim 11. At the same time, wire 12 is received loosely within groove 14 on the inside surface of rim 11, as shown by the dash lines in FIG. 3. More detail is shown in the cross-sectional views of rim 11 taken along lines 4—4 and 5—5 of FIG. 3 which are illustrated in FIGS. 4 and 5, respectively.

Figure 5:
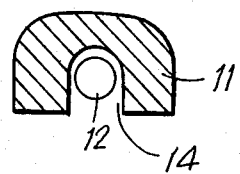
FIG. 5 is a sectional view taken along line 5—5 of FIG. 3.

In FIGS. 4 and 5, rim 11 is rotated clockwise by 90° from its position shown in FIG. 3. Therefore, lens 13 is positioned under rim 11 in FIGS. 4 and 5. Hole 17 is formed with a diameter which is greater than the width of groove 14 so that enlarged head portion 18 of wire 12 is received in hole 17 and may not be removed in the direction of an arrow A in FIG. 3. The inlet of hole 17 may be deformed to insure further the prevention of withdrawal of enlarged head portion 18 therefrom.

A securing member 19 is attached by braising to the opposite end 11b of rim 11 shown on the right-hand side of FIG. 3. Securing member 19 is formed with a threaded hole 20 shown in vertical orientation in the elevational view of FIG. 3. A fitting member 21 formed with a threaded hole 23 for receiving a screw 22 for connecting fitting member 21 to securing member 19. Fitting member 21 is also formed with a stepped hole 24 and channel 24a for forming a shoulder for receiving the opposite end of wire 12. The opposite end of wire 12 is also formed within enlarged head portion 25 for engaging the shoulder within stepped hole 24 so that wire 12 will not be withdrawn from hole 24 when pulled in the direction shown by an arrow B. Enlarged head portion 25 may also be formed by forging as enlarged head portion 18 at the opposite end of wire 12.

Stepped hole 24 and channel 24a in fitting member 21 is formed with an inclined axis with respect to the axis through threaded hole 23 of fitting member 21. This permits wire 12 extending outwardly from hole 24 and channel 24a to be received snuggly within groove 16 around lens 13 and remain entirely invisible when viewed from the front elevation of frame 10. This provides a pleasing appearance to the spectacle prepared in accordance with this embodiment of the invention.

Figure 6:
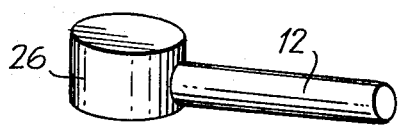
FIG. 6 is a perspective view of the end of a thin wire and fixing member in accordance with another embodiment of the invention.
Figure 7:
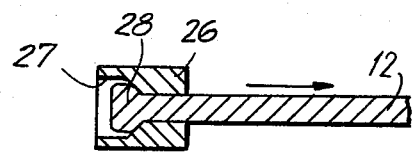
FIG. 7 is a cross-sectional view of the member of FIG. 6.

It is possible to secure wire 12 to rim 11 in a different manner from that shown in FIG. 3. Specifically, in FIG. 6 a separate fixing member 26 replaces enlarged head portion 18 formed by forging at one end of wire 12 as illustrated in FIG. 3. Fixing member 26 is firmly attached to the end of wire 12. In FIG. 7, the relationship between wire 12 and fixing member 26 is shown in the cross-section. Fixing member 26 is provided with a stepped hole 27 defining a shoulder 27a and wire 12 which extends through hole 27 has an enlarged extremity 28 engaging shoulder 27a in hole 27 so that it may not be withdrawn when pulled in direction of an arrow C in FIG. 7. Wire 12 is secured to rim 11 in the same manner as in the above-described embodiment in the other respects. Fixing member 26 is forced into hole 17 in rim 11.

Accordingly, by preparing spectacle frames in accordance with the invention, a thin wire is secured to a spectacle frame mechanically as described above. In the event that the wire is a metal, the mechanical method of connection relieves it from any adverse effects of heat which may arise due to braising or other methods relying on application of heat. The mechanical method is particularly effective for a wire of a Ni-Ti alloy, since it permits full maintenance of the strength of the wire. Thus, the mechanical connection of the wire and the rim in accordance with the invention permits use of a very thin wire. This mechanical method is also preferable from the standpoint of fabrication accuracy, and moreover, in view of the fact that a thin wire does not impair the appearance of the spectacles. This is also true with a wire of a plastic material and the mechanical method provides a lens holding structure which is both accurate in fabrication and pleasing in appearance.

The Ni-Ti alloy preferably utilized for wire 12 in accordance with the invention is an alloy containing preferably between about 50.5 and 51.5 atomic percent of Ni. Alloys of this type are described in U.S. Pat. No. 3,174,851.

It will thus be seen that the objects set forth above, and those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A structure for holding a spectacle lens comprising:

an elongated frame member extending across the upper portion of the structure and including a first fixed wire-holding location and a second removeable wire-holding location for mounting the lens onto and removing the lens from the structure; and a thin wire of a super-elastic Ni-Ti Alloy containing from about 50.5 to 51.5 atomic percent Ni extending from the first fixed wire holding location on the frame member under the lens to the second removeable wire-holding location of the frame member;

wherein said first fixed wire holding region of said frame member for holding said wire includes a hole and a groove extending substantially parallel to the edge of the lens, said wire is received in said groove at one end of the wire and the wire is provided with enlarged end means, said enlarged end means being engaged in said hole, whereby said wire is secured in said hole and groove in said frame member.

2. The lens holding structure of claim 1, wherein the opposite end of the wire terminates in enlarged end means and said removable wire holding location includes a fitting member formed with a stepped hole defining a shoulder and a channel substantially parallel to the edge of the lens and a securing member firmly attached to said frame member spaced apart from said hole and channel in said fitting member, the opposite end of the wire and enlarged end region seated in said hole and extending through said channel with said enlarged end means engaging said shoulder, said fitting member anchored to said securing member for holding the lens in position in said structure.

3. The lens holding structure of claim 2, wherein the channel in said fitting member is formed on an axis inclined towards the lens for permitting the wire extending outwardly from the channel to be received snuggly about a lens supported by the structure.

4. The lens holding structure of claim 2, wherein said enlarged head means is an enlarged region having a dimension greater than the diameter of the wire.

5. The lens holding structure of claim 4, wherein the enlarged end region includes a fixing member attached to one end of the wire, said end of the wire having an enlarged head and said fixing member being formed with a stepped opening defining a shoulder and channel therethrough, said wire extending through said stepped hole and channel and said enlarged head means engaging said shoulder of said fixing member.

6. The lens holding structure of claim 4, wherein said frame includes a groove adapted to receive an elongated strip which is engaged in a groove in a lens for securing the lens to the frame.

* * * * *